UNITED STATES PATENT OFFICE.

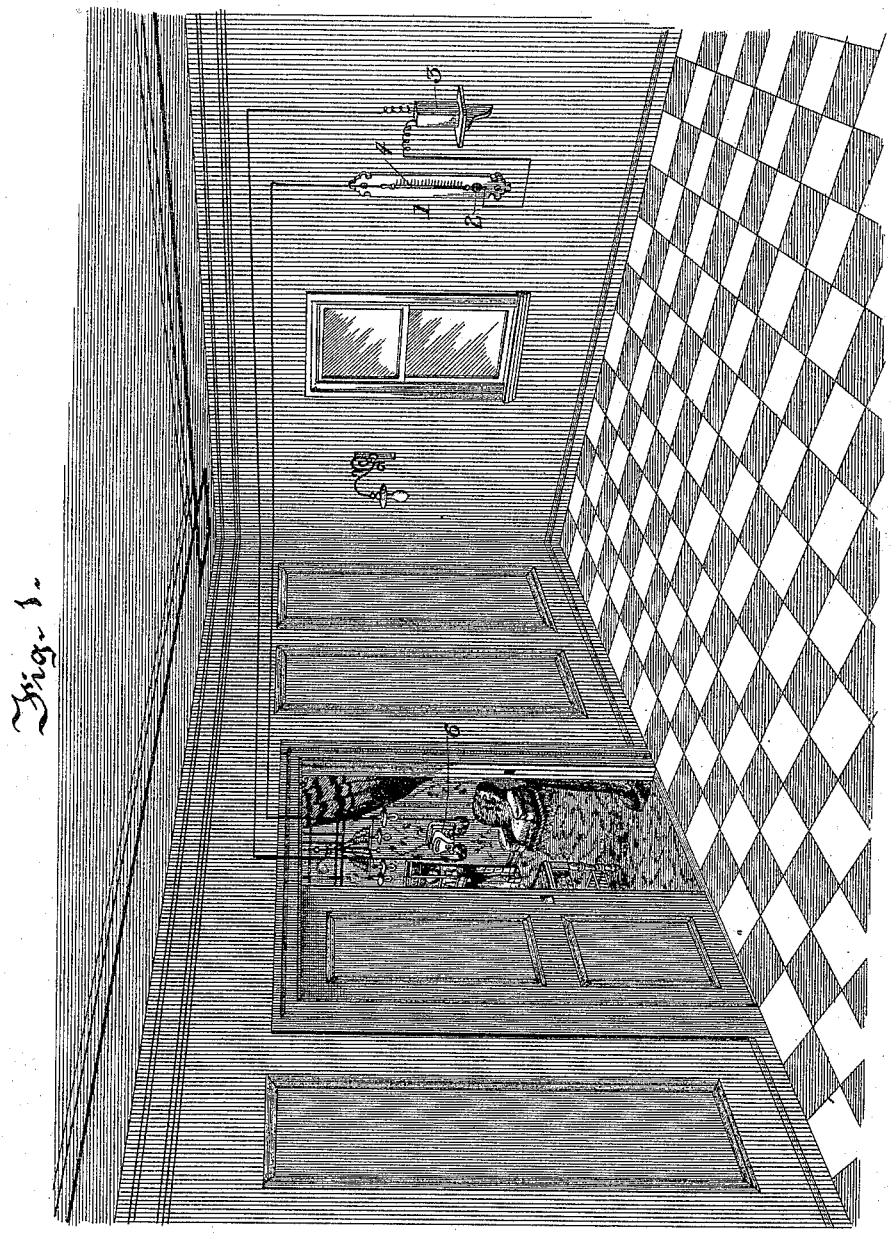

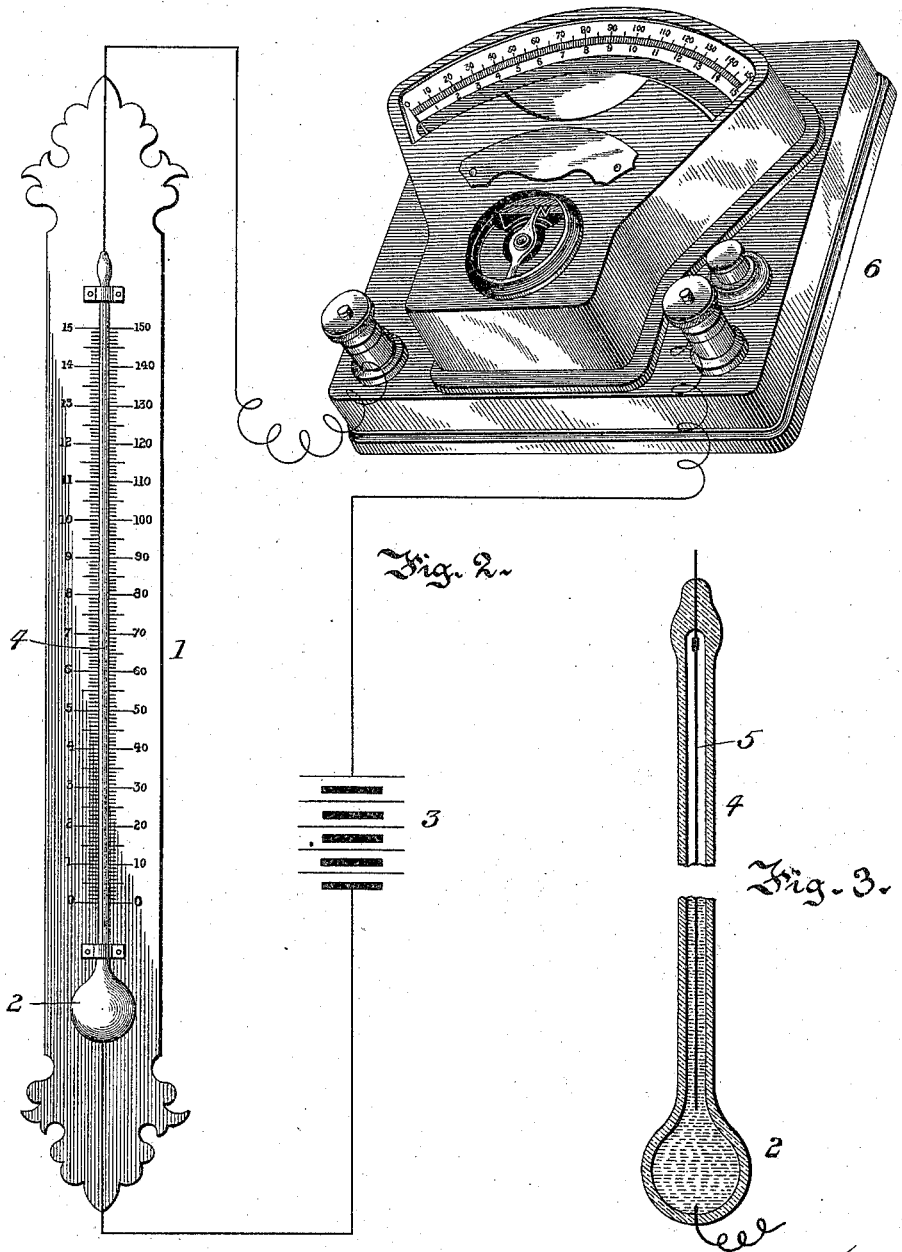

CLYDE J. COLEMAN, OF CHICAGO, ILLINOIS, ASSIGNOR TO HIMSELF AND LOUISA M. GOODRICH, OF SAME PLACE.

ELECTRIC INDICATOR.

SPECIFICATION forming part of Letters Patent No. 526,220, dated September 18, 1894.

Application filed December 8, 1893. Serial No. 493,151. (No model.)

*To all whom it may concern:*

Be it known that I, CLYDE J. COLEMAN, a citizen of the United States, residing at Chicago, in the county of Cook and State of Illinois, have invented a certain new and useful System of Electric Indication; and I do hereby declare the following to be a full, clear, and exact description of the same, reference being had to the accompanying drawings, forming a part of this specification.

This invention relates to that class of electrical apparatus intended for use in indicating at a central station or office, variations in temperature or pressure, as they occur at points removed from such station, and tributary thereto; and the present improvement has for its object to provide a simple, cheap and effective apparatus for automatically indicating the changes of temperature or pressure as they occur, however minute, and which embodies as necessary elements in the electric circuit a standard cell, or other source of electro motive force; a galvanometer, or other like current measuring appliance; and a thermometer or other like instrument operating upon a section of high resistance material, to automatically cause a reciprocal change in the degree of resistance thereof, corresponding with the change in the degree of temperature or pressure. I attain such objects by the construction and arrangement of parts illustrated in the accompanying drawings, in which—

Figure 1, is a perspective view illustrating the general arrangement of my present invention; Fig. 2, a view illustrating the galvanometer, thermometer, standard cell, and circuit embracing the same, and Fig. 3, an enlarged section of the thermometer, and the high resistance filament inclosed therein.

Similar numerals of reference indicate like parts in the several views.

Referring to the drawings 1, represents a thermometer in the bulb 2, of which is fused or otherwise secured a terminal wire or conductor, by which the mercury in the bulb is put in electrical connection with one of the poles of the standard cell or battery 3. In the bore of the thermometer shank 4, is arranged a rod or filament of high resistance material 5, preferably a carbon filament, such as is used in incandescent lamps, which is fused or otherwise inserted in the top of the thermometer shank 4, as shown. With this improved arrangement the rise and fall of the mercury around such high resistance filament reciprocally changes the amount of resistance in the electric circuit of the present system, in accordance with the length of such filament that remains immersed, and such variations of the resistance will be indicated upon the circuit measuring instrument 6, preferably a galvanometer of the astatic type, inserted in the present circuit; the graduations of the thermometer and current measuring instrument being alike, so that one will indicate correctly the changes in the other.

In connection with the present invention the needle of the galvanometer may be employed to close a secondary electric circuit, to ring an alarm bell, when a predetermined temperature has been reached, in manner usual to electric alarm appliances.

In use any number of individual thermometers and their accompanying galvanometers can be inserted in their own, or branch circuits from a single standard battery, in accordance with the number of different rooms or points from which an indication is required; or with suitable circuit closers, all the series of thermometers can be successively indicated upon a single galvanometer common to all.

While on the grounds of simplicity and efficiency, preference is to the type of apparatus illustrated in the drawings, and which consists of a high resistance filament immersed in mercury, and adapted to have its degree of resistance varied by the rise and fall of the mercury due to changes in temperature or pressure, the scope of my present invention, however, embraces broadly, the combination in the electric circuit, of a standard cell, a galvanometer, an inserted section of high resistance material, and a column of mercury moving in constant contact, and parallel relation with the section of resistance material, and adapted to vary the degree of such resistance, reciprocally with changes in temperature or pressure, by the lengthening and shortening of such resistance, the action being of a continuous nature as distinguished from the step by step action of the devices heretofore used and proposed for a like purpose.

Having thus fully described my said invention, what I claim, and desire to secure by Letters Patent, is—

1. An electric indicating system comprising the combination of a standard cell, or other uniform source of electro-motive force, a current measuring instrument, a variable resistance, and a resistance varying device consisting of a column of mercury, moving in constant contact and parallel relation with the variable resistance, when affected by heat or pressure, to reciprocally vary the degree of such resistance, substantially as set forth.

2. In an electric indicating system, the combination of a standard cell, or other uniform source of electro motive force, a current measuring instrument, a variable resistance formed of a rod or filament of high resistance material, and a thermometer or other mercury containing device, the shank of which incloses such resistance filament, the degree of resistance of such filament varying with the degree of immersion thereof in the mercury, substantially as set forth.

3. In an electric indicating system, the combination of a standard cell, or other uniform source of electro motive force, a current measuring instrument, a variable resistance formed of a carbon rod or filament, and a thermometer, or other mercury containing device, the shank of which incloses such resistance filament, the degree of resistance of such filament varying with the degree of immersion thereof in the mercury, substantially as set forth.

In testimony whereof witness my hand this 21st day of November, 1893.

CLYDE J. COLEMAN.

In presence of—
ROBERT BURNS,
JOHN ENDERS, Jr.